C. KOSHALKO.
STREET CAR FENDER AND SNOW SWEEPER.
APPLICATION FILED MAR. 21, 1914.
1,102,763.
Patented July 7, 1914.
2 SHEETS—SHEET 1.
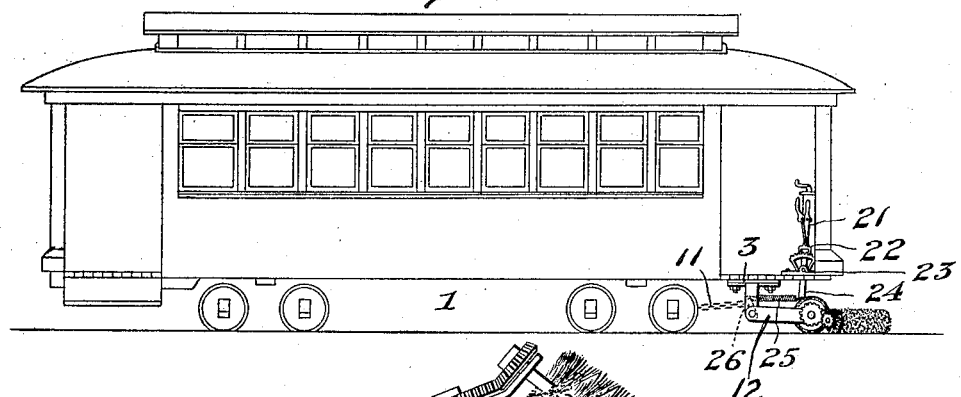
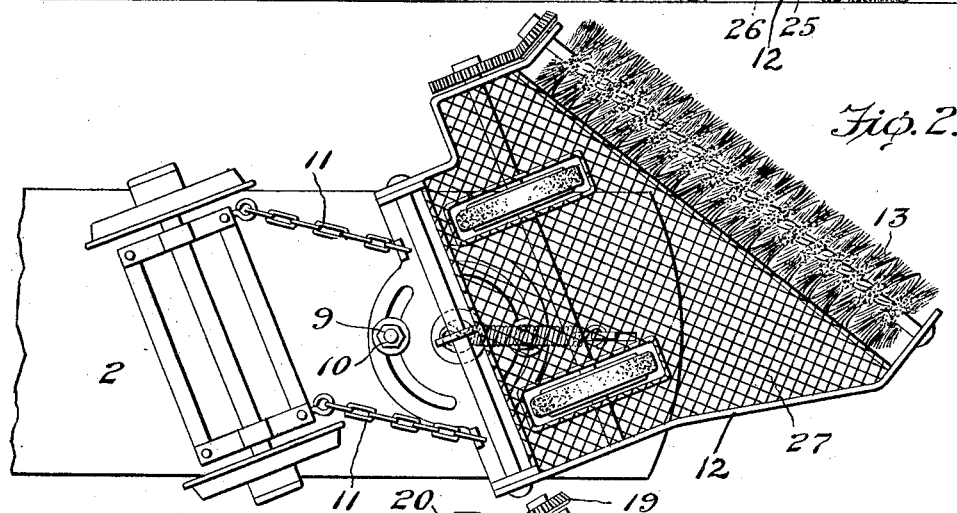
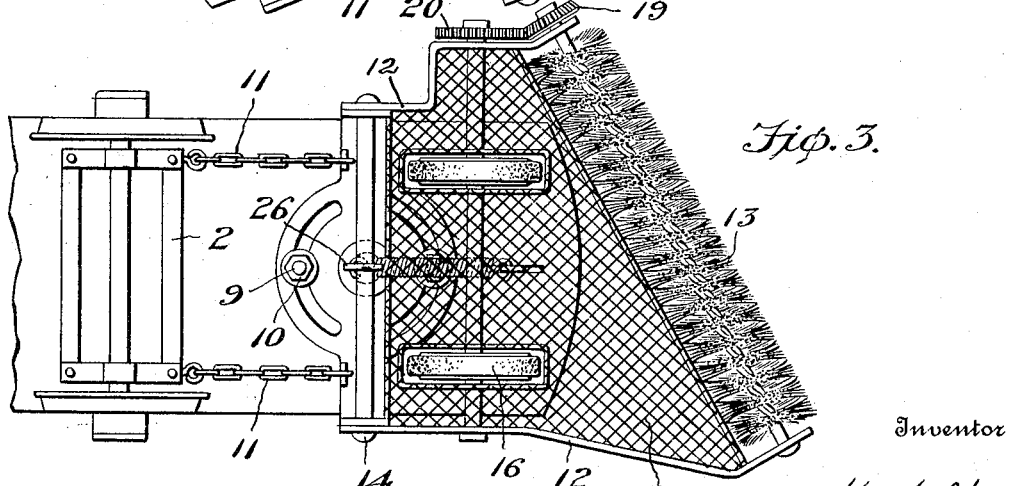
Witnesses
Inventor
Charles Koshalko
By
his Attorney C. KOSHALKO.
STREET CAR FENDER AND SNOW SWEEPER.
APPLICATION FILED MAR. 21, 1914.
1,102,763.
Patented July 7, 1914.
2 SHEETS—SHEET 2.
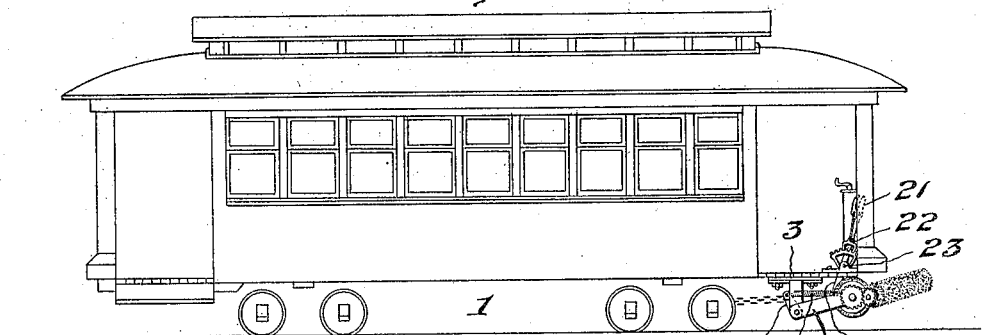
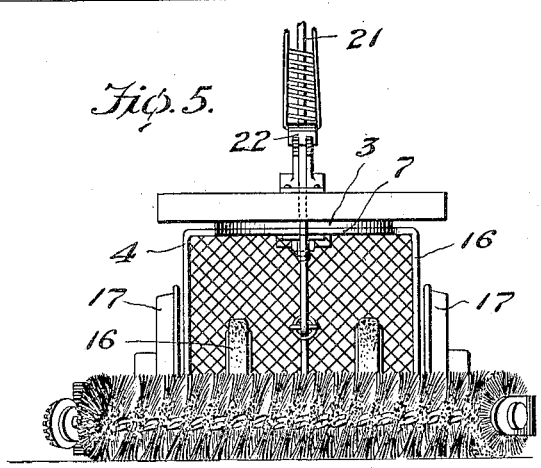
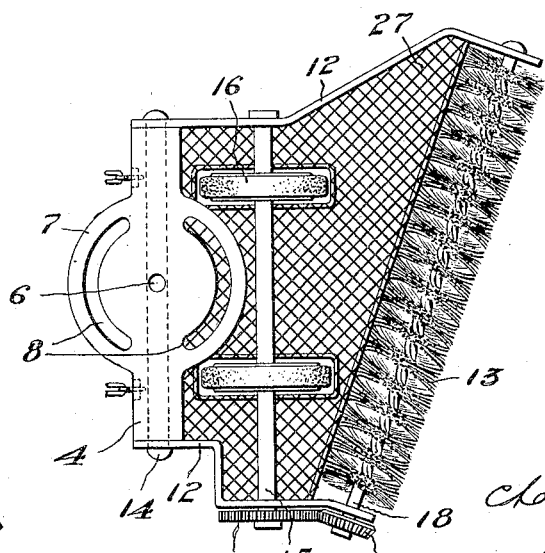
Inventor
Charles Koshalko

UNITED STATES PATENT OFFICE.

CHARLES KOSHALKO, OF JOHNSTOWN, PENNSYLVANIA, ASSIGNOR OF ONE-HALF TO JOSEPH CAUFFIEL. OF JOHNSTOWN, PENNSYLVANIA.

STREET-CAR FENDER AND SNOW-SWEEPER.

1,102,763. Specification of Letters Patent. Patented July 7, 1914.

Application filed March 21, 1914. Serial No. 826,224.

*To all whom it may concern:*

Be it known that I, CHARLES KOSHALKO, a citizen of the United States, residing at Johnstown, county of Cambria, and State of Pennsylvania, have invented certain new and useful Improvements in Street-Car Fenders and Snow-Sweepers, of which the following is a specification.

This invention relates to street car, motor truck, or automobile fenders and snow sweepers.

The object of the present invention is the provision of an improved fender and snow sweeper, as set forth, adapted to be readily applied to any car, automobile, or motor truck, which may be adjusted or set at different heights, according to requirements of use, and when set will be yieldingly arranged so that it will adapt itself to inequalities of the road bed and will pass over small obstructions without breakage; one which will be adapted for lateral turning by the front truck of the vehicle and may, when turned to any lateral position, be adjusted upwardly or downwardly and held where adjusted; said fender and snow sweeper having supporting wheels and, preferably, a rotary fender and sweeper brush driven directly from said supporting wheels, but in its broadest aspect, the invention is not to be construed as limited, except where stated in the claims, to the use of a rotary brush driven by supporting wheels, as those inventive features relating to the lateral and vertical adjustment of the fender may be carried out in fenders which do not employ a rotary brush and supporting, driving, wheels therefor.

One embodiment of the invention is set forth fully hereinafter and disclosed in the drawings, but I am aware that the invention is susceptible of various modifications and the disclosure is to be considered as illustrative, rather than restrictive, of the scope of the invention.

The invention consists, first, of a fender or snow sweeper adapted for both lateral and up and down movement and for adjustment and securement at any desired height, regardless of the lateral position of the fender; second, a construction such as just set forth wherein the fender is supported by wheels and, further, has a rotary brush driven by said wheels; third, a fender or snow sweeper which may be set in lowered position and yieldingly held in such position, whereby it may yield to pass slight obstructions and to adapt itself to inequalities in the roadbed.

In the accompanying drawings: Figure 1 is a side elevation of a street car to which my invention is applied, the brush being down; Fig. 2, a detail bottom view showing the brush as it appears when the car truck turns; Fig. 3, a view like Fig. 2, but showing the brush in normal position, as when the car is traveling on a straight track; Fig. 4, a view like Fig. 1, but showing the brush raised; Fig. 5, a front elevation; and Fig. 6, a detail plan of the invention, removed from the car.

The present invention is adapted for use either as a fender or as a snow sweeper for street cars, motor trucks, or automobiles. The revolving brush may be provided with bristles or with steel wires or of any other material. The supporting traction wheels for the brush frame may run on the roadbed between the rails of the track or on the rails themselves.

An ordinary type of street car is shown at 1, which is provided with the usual pivoted trucks 2. Secured to the bottom of the car platform is a wear-plate 3, preferably circular. The main frame 4 of the sweeper or fender is pivoted to the car platform by a bolt 5 extending through an opening 6 in said frame 4 and through the wear-plate 3. The frame 4 is provided with a circular wear-plate 7 which has arc-shaped slots 8. Bolts 9 secured to the platform and passing through the wear-plate 3, have their shanks lying in the slots 8 and their nuts and washers 10 bearing against the wear-plate 7. Means are thus provided whereby the brush supporting frame is pivoted to swing in a horizontal plane so that it may assume a position such as shown in Fig. 2, for instance. To cause the frame 4 to move in substantial parallelism with the truck 2, there are provided chains 11 which connect the truck and frame 4 so that, as the car rounds a curve, the brush is properly swung to conform to the track and road-bed.

To the lower ends of the depending parts of frame 4 is pivoted the vertically movable frame 12 which carries the brush 13. This connection is preferably a single pivot bolt 14. Not only is the brush 13 adapted to swing horizontally by the turning of the frame 4, but it is also adapted to swing up and down, regardless of the position to which it may be moved laterally, due to its mounting in the vertically movable frame 12.

A shaft 15 which is journaled in the side parts of the frame 12, carries traction wheels 16 rigidly secured thereto. The traction wheels are preferably provided with rubber tires. In the form of the invention shown in the drawings, these wheels are placed so that they will run on the road-bed between the rails of the track on which the car 1 travels, as will be clear from Fig. 5, where the car wheels appear at 17. The traction wheels 16 may, however, be arranged to travel on the rails of the track and they may be flanged wheels, if desired. Except where stated in the claims, I do not limit myself to wheels which travel on the road-bed between the rails, but I prefer such construction, especially in connection with tracks which have a smooth or comparatively smooth, surface, such as the asphalt or paving block road-bed commonly used on street railways in cities. The brush 13 is carried by a shaft 18 which is journaled in the forward ends of the frame members 12, said shaft having a gear 19 which meshes with a gear 20 secured to rotary shaft 15. Consequently, the brush 13 is positively driven by the traction wheels 16 and I am thereby enabled to entirely dispense with any driving connection between the brush and an axle of the car 1. This enables the fender and sweeper to be attached to any street car without having to modify or apply a driving connection to the axle thereof.

The brush 13 may be of bristles, steel wire, or other material. It is arranged in inclined relation to the direction of travel of the car, and crosswise of the rails and road-bed, and its driving connections are such that it rotates in a counter clock-wise direction and hence is adapted to sweep or brush from the track any object in its path. The brush is, therefore, adapted for use as a fender or snow sweeper and is usable to accomplish both objects at the same time. Being pivotally mounted so that it can rise and fall, and being adapted to rise and fall according to the inequalities of the road-bed, or those of the track rails, according as the wheels 16 travel on one or the other, the brush may be positioned as close to the road-bed and rails as desired and will remain in that position with adaptability to rise as may be necessary.

I find it advantageous to combine in one mechanism, means for raising and lowering the frame 12, wheels 16 and brush 13 and for yieldingly securing the brush wherever positioned. To that end there is provided on the platform an operating lever 21 having a latch and locking segment 22 of ordinary construction and pivoted at 23, the lower end 24 of the operating lever being connected by a coil spring 25 to an arm 26 secured to shaft 14. The arm 26 being secured to shaft 14 and the latter secured to the frame 12, when the latch of the lever 21 is released, the brush and its frame 12 will fall and may be locked by the lever in any desired position. When the brush and its frame are to be raised, an opposite movement of the lever acting through the relatively stout coil spring 25, is had, and the latter serves as a link to force back the arm 26 and elevate the frame 12. Pneumatic or electrical operating means could be substituted for lever 21. I am aware that a combined rod and coil spring could be substituted for the spring 25 to accomplish the same purpose and I, therefore, consider the inclusion of any spring means an equivalent of the spring 25. The lever 21 being locked and the brush in its lowered position, the brush may rise, even when locked, as the spring 25 will yield to permit the necessary play and prevent any breakage, but the spring is sufficiently stout to prevent any rising of the brush when a person is struck by the brush. A suitable netting 27 is connected to the frame 12 and extends from the front part thereof up to the frame 4, to the top and depending parts of which it is connected.

Having thus described my invention, what I claim as new and desire to secure by Letters Patent, is:

1. In a fender and snow sweeper for cars, the combination with a pivoted car truck, of a laterally swinging frame operatively connected to the truck so that it will swing laterally therewith, a vertically movable frame carried by the laterally movable frame, traction wheels for supporting said vertically movable frame, a fender carried by said vertically movable frame, and means for raising and lowering the vertically movable frame when in any position to which it may be turned laterally by the swinging of the laterally movable frame.

2. In a fender and snow sweeper for cars, the combination with a pivoted car truck, of a laterally swinging frame operatively connected to the truck so that it will swing laterally therewith, a vertically movable frame carried by the laterally movable frame, a rotary brush carried by the vertically movable frame, traction wheels which support the vertically movable frame, means for driving the brush from the traction wheels, and means for raising and lowering the vertically movable frame in whatever position it may be turned laterally by the laterally movable frame.

In testimony whereof, I hereunto affix my signature in presence of witnesses.

CHARLES KOSHALKO.

Witnesses:
E. J. MILES,
JOS. CAUFFIEL,
KATE ARTHUR.